3,409,708
METHOD OF MAKING SOLID PROPELLANT EXPLOSIVE
David Pelton Moore, Marlow, N.H.
(9210 Flower Ave., Silver Spring, Md. 20901)
No Drawing. Continuation-in-part of application Ser. No. 603,412, Dec. 21, 1966. This application Nov. 21, 1967, Ser. No. 684,634
2 Claims. (Cl. 264—3)

ABSTRACT OF THE DISCLOSURE

This is a solid propellent explosive in which the binder is composed of a natural or synthetic rubber and starch, and in which the mass after being stirred to thoroughly combine the two, is heated to 75–85° C., preferably 80° C., to swell the starch and permit the same to be in shape to receive the oxidant, selected from the group of alkali salts consisting of ammonium nitrate, ammonium chlorate, ammonium perchlorate, potassium nitrate, potassium chlorate, potassium perchlorate, sodium nitrate, sodium chlorate and sodium perchlorate, or any combinations thereof to make a solid propellent as well as a substitute for dynamite and TNT.

---

The present invention relates to improvements in solid propellent explosives and methods of making same, and this application is a continuation-in-part of the application filed Dec. 21, 1966, Ser. No. 603,412 and which latter application is hereby abandoned.

It has been discovered that starch when mixed with natural or synthetic rubber, as vinyl chloride copolymers are called, when subjected to heat at a temperature of from 75 to 85° C., preferably 80° C., will be swollen, as set forth in the Himalaya Patent No. 853,403, while the copolymers employed are Geon 576, Exon, and the copolymers set forth in Patent No. 3,171,522, the starch being similar to Hoosier 5, or a lower cost starch, to reduce the cost of the binder, which is also a fuel.

The starch may vary from 7 to 20% by weight of the entire explosive mixture, the companion rubber from 4.05 to 16% by weight, and the oxidant 60 to 90% by weight.

In mixing these ingredients, the proper proportions of starch and the natural rubber are mixed thoroughly together, and in a double boiler are heated to 75 to 85° C., preferably 80° C., until the starch has been swollen.

At this point, the selected oxidant, or combination of oxidants, selected as above noted from the group of alkali salts, is added and stirred until the mass is dough-like or putty-like. Then the mass is molded in desired shapes, such as rocket motor sections, booster rockets, or extruded into particle shapes, the molded mass being solid propellents, and the particles being substitutes for dynamite and TNT.

The power to be obtained is judged by the amount of the oxidant, and also by what types are used, i.e., nitrates for low pressure and the chlorates and perchlorates for high explosive force.

The explosive, when shaped, will dry in the mold or at atmospheric temperature, as the method by means of which the starch and its companion binder, appears to absorb any water that assists in the swelling of the starch particles, and thus there is no sweating of the molded solid propellents, and no need of preheat application to dry or vulcanize.

The rubber compound of Patent No. 2,341,055, in which a latex carrying a coagulator and retarder has been found, when starch is added and heated as set forth above, to cause the starch as in the Himalaya patent to swell and enshroud the water and also the oxidant, and when in a putty-like mass can be immediately molded into rockets and rocket section shapes. The mold can be removed in a few hours, and the shape will be retained without additional heat or pressure.

Both natural rubber and synthetic rubber have similar action with pulverized starch.

What is claimed is:

1. The method of making an explosive mixture comprising intimately mixing together an oxidant selected from the alkali salts consisting of ammonium nitrate, ammonium chlorate, ammonium perchlorate, potassium nitrate, potassium chlorate, potassium perchlorate, and sodium nitrate, 60 to 90% by weight, rubber and starch, and in which the rubber and starch have been mixed together intimately and heated from 75 to 85° C. to produce a putty-like mass, the starch ranging from 7 to 20% by weight and the rubber ranging from 4.05 to 16% by weight, shaping the mass, and drying the shaped explosive.

2. An explosive made in accordance with the method set forth in claim 1.

References Cited

UNITED STATES PATENTS

| | | | |
|---|---|---|---|
| Re. 26,108 | 6/1964 | Moore | 149—19 |
| 1,819,457 | 8/1931 | Dehn | 149—19 |
| 2,966,403 | 12/1960 | Weil | 149—19 |

BENJAMIN R. PADGETT, *Primary Examiner.*